United States Patent [19]

Mollier

[11] Patent Number: 4,683,553
[45] Date of Patent: Jul. 28, 1987

[54] METHOD AND DEVICE FOR PROTECTING SOFTWARE DELIVERED TO A USER BY A SUPPLIER

[75] Inventor: Jean Mollier, Bougival, France

[73] Assignee: Cii Honeywell Bull (Societe Anonyme), Paris, France

[21] Appl. No.: 828,080

[22] Filed: Feb. 5, 1986

Related U.S. Application Data

[63] Continuation of Ser. No. 698,261, Feb. 5, 1985, abandoned, which is a continuation of Ser. No. 476,494, Mar. 18, 1983, abandoned.

[30] Foreign Application Priority Data

Mar. 18, 1982 [FR] France .............................. 82 04612

[51] Int. Cl.$^4$ ............................................. H04L 9/00
[52] U.S. Cl. ...................................... 380/4; 235/382; 235/376; 364/900; 380/25
[58] Field of Search ... 364/200 MS File, 900 MS File; 235/376, 380, 382, 382.5, 384, 385, 487; 178/22.08, 22.09

[56] References Cited

U.S. PATENT DOCUMENTS

| | | | |
|---|---|---|---|
| 4,105,156 | 8/1978 | Dethloff | 235/441 |
| 4,120,030 | 10/1978 | Johnstone | 364/200 |
| 4,168,396 | 9/1979 | Best | 364/900 |
| 4,211,919 | 7/1980 | Ugon | 235/487 |
| 4,278,837 | 7/1981 | Best | 364/900 |
| 4,281,216 | 7/1981 | Hogg et al. | 178/22.08 |
| 4,288,659 | 9/1981 | Atalla | 178/22.09 |
| 4,306,289 | 12/1981 | Lumley | 364/200 |
| 4,319,079 | 3/1982 | Best | 178/22.09 |
| 4,433,207 | 2/1984 | Best | 178/22.09 |
| 4,453,074 | 6/1984 | Weinstein | 235/380 |
| 4,458,315 | 7/1984 | Uchenick | 364/200 |
| 4,465,901 | 8/1984 | Best | 364/200 |
| 4,471,163 | 9/1984 | Donald et al. | 364/200 |
| 4,558,175 | 12/1985 | Genest et al. | 178/22.08 |

OTHER PUBLICATIONS

IBM Technical Disclosure Bulletin, "Protection of Memories on a Word Basis", J. Evans et al.

Primary Examiner—Gareth D. Shaw
Assistant Examiner—Kevin A. Kriess
Attorney, Agent, or Firm—Kerkam, Stowell, Kondracki & Clarke

[57] ABSTRACT

The invention relates to a method and a device for protecting software delivered to a user by a supplier. The method amounts to rendering the programs non-executable in the state in which they have been delivered to the users. With each program ($P_i$) there is associated a validation key defined via a main validation key ($V_i$) delivered by the supplier and recorded in a storage area (M) of the user's machine (1), and via a supplementary key ($V'_i$) computed on the lever of a card (C) issued to the user via a secret code (S) and via arguments ($b_i$) that identify each program ($P_i$) and are recorded in a storage area (M1) of the card (C).

8 Claims, 1 Drawing Figure

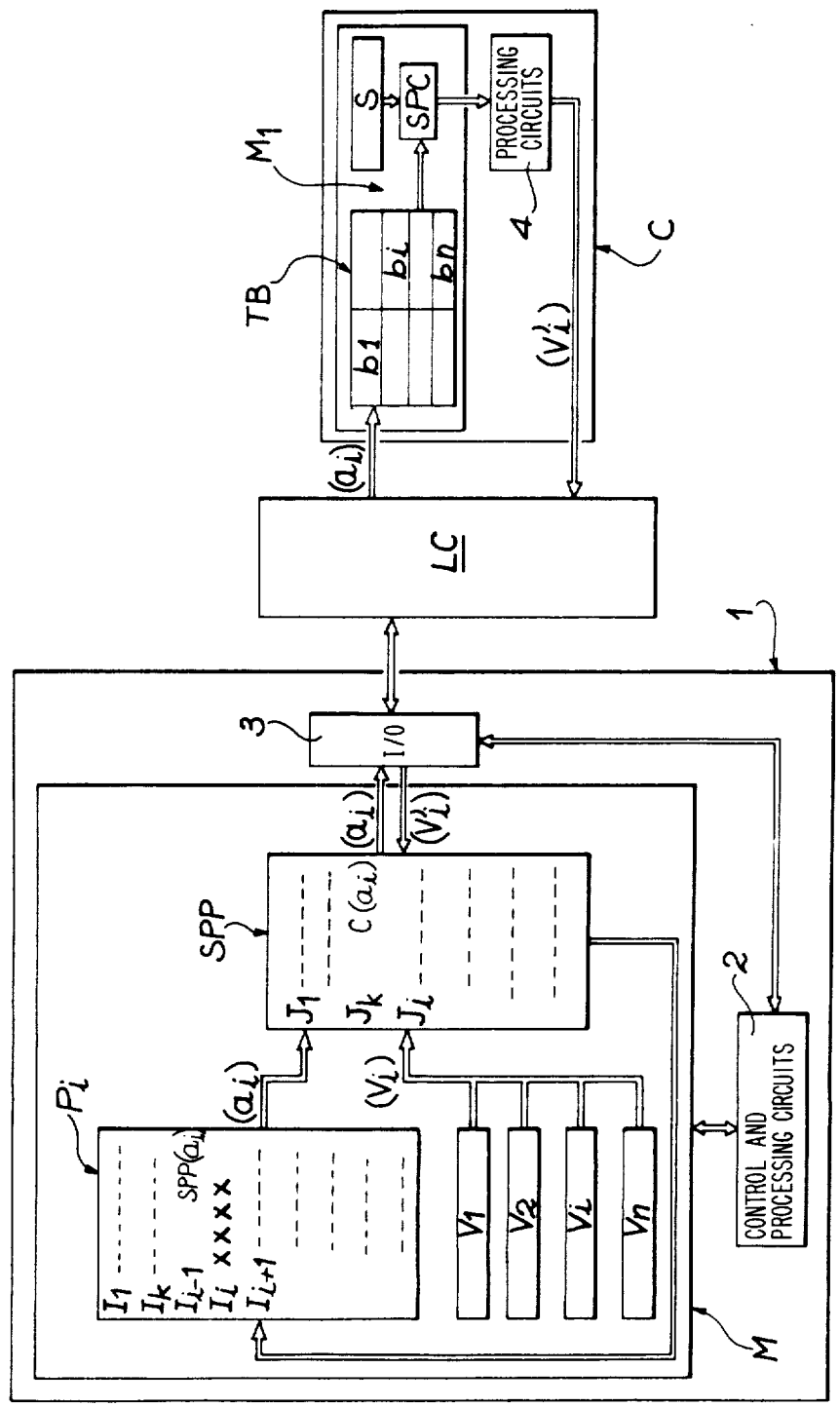

METHOD AND DEVICE FOR PROTECTING SOFTWARE DELIVERED TO A USER BY A SUPPLIER This is a continuation of application Ser. No. 698,261, filed Feb. 5, 1985, (now abandoned) which in turn is a continuation of Ser. No. 476,494, filed Mar. 18, 1983 (now abandoned).

BACKGROUND OF THE INVENTION

Field of the Invention

The invention relates generally to a method and a device for protecting software and is more particularly aimed at providing a method and a device by means of which a supplier who delivers software to a user remains in control of this software by rendering it non-executable in the form in which it is delivered, the execution of said software being under the control of a validation key delivered to the user by the software supplier.

Definitions

At the outset, the expressions "software", "software protection" and "non-executable software" will be defined.

1. Software and software protection

Software is understood to be at least one program in the conventional sense and, more generally, a set of programs. Generally, the organization of a software system associated with a data processing machine is such that a minimum of protection is given to the programs as a result of procedures made available by the operating system of the machine. Thus, the user program and system programs benefit from a mutual protection, each program having an assigned memory space which cannot be accessed by the other programs. As a matter of fact, such protection is inherent in the satisfactory management and smooth operation of a computer center.

The software protection provided by the invention is located at a different level. More specifically, the point in question is to give the software supplier a maximum guarantee as to the diffusion of this software. In other words and within the spirit of the invention, it is not a question of giving the software a protection in the sense of a literary and artistic property by seeking to protect the very content of the software, but it is a question of giving the owner of a software protection with respect to a potential user by giving him the means of ensuring that only this user will be able to use said software.

Indeed, from the moment a supplier negotiates with a potential user the rental or sale of a program, this supplier heretofore has not had any means of checking as to the use of this program by said user. Because of that, this user has heretofore very easily been able to take the place of the supplier to deliver, in his turn, the program to another user.

2. Non-executable software

Generally, any program is not directly executable by a data processing machine. Indeed, a program must undergo several transformations prior to its execution. Within the spirit of the invention, the program, even after undergoing the aforesaid transformations, will still remain non-executable.

Still within the spirit of the invention, this notion of non-execution of a program is not to be associated with a notion of secret. As a matter of fact, it is not a question of prohibiting the knowledge of the program to the user, but to control the use of this program by this user.

According to the invention, the supplier is thus induced to give to any potential user an incomplete or scrambled program and at least one validation key that will enable him to execute the program.

SUMMARY OF THE INVENTION

Therefore, the invention proposes a method of protecting software consisting of programs, the owner or supplier of these programs being induced to negotiate these programs with potential users who have at least one data processing machine on which these programs can be executed. So as to enable the supplier to remain in control of the diffusion of these programs once they have been issued to the users the invention comprises the steps of:

rendering non-executable the programs in the state in which they have been delivered to the users;

issuing to each user at least one portable carrier such as a card comprising at least processing circuits and a storage area where a secret code known only to the supplier and peculiar to each user has been recorded; and for each user, associating with each program a key of predetermined validation defined in accordance with the program and with the secret code contained in the user's card, for the necessary transformation of said program into an executable program once the card is coupled or connected to the user's machine.

According to another feature of the method of the invention, the aforesaid validation key is defined, on the one hand, via a main validation key issued by the supplier and available on the user's machine and, on the other hand, via a supplementary key of computed validation on the level of the card issued to the user, via the secret code and via arguments of identification that are peculiar to each program and which have been recorded in the storage area of the card.

According to another important feature of the invention, the method comprises the steps of keeping the same arguments for the same program regardless of the user of this program; and giving a main validation key which is different, on the one hand, for each program delivered to a user and, on the other hand, for the same program delivered to another user.

The interest of such a method resides especially in the invoicing by a supplier of the software sold or rented to a user. In other words, a supplier can possess a library of n programs which can be sold or rented to a user who, through payment, will enter into possession of all or part of said library.

Thus, the supplier will define a validation key for each program chosen by a user and will issue a card which is unique to said user and in which a secret code has been recorded known solely to the supplier and unique to the user. By means of this validation key and the secret code, as described earlier, each program can be rendered executable. It will be understood, of course, that once a program has been rendered executable, it can be stored in the primary storage memory of the machine and can be reused directly without again calling upon the protection procedure according to the invention, but this procedure will again be used each time the program is reloaded in the primary storage.

BRIEF DESCRIPTION OF THE DRAWINGS

Other features, advantages and details will be more readily understood by reference to the explanatory description given hereinbelow in conjunction with the accompanying schematic drawing given by way of example and which illustrates schematically the principle of the method according to the invention.

DESCRIPTION OF THE PREFERRED EMBODIMENTS

Let it be assumed that a person has a library of programs ($P_1 \ldots P_i \ldots P_n$). This person, who may be a supplier, is likely to rent or sell these programs to potential users who have at least one data processing machine on which these programs can be executed.

Before explaining in detail the method of the invention, which henceforth will enable this supplier to check the diffusion of the programs delivered to users, the physical means which are indispensable for the execution of the method and the nature of the data processed thereby will be described briefly.

Now, referring to the drawing, a data processing machine (1) of a potential user of the programs ($P_1 \ldots P_i \ldots P_n$) comprises at least one memory (M), circuits (2) for controlling and processing the data stored in the memory (M), and an input/output device (3).

The memory (M) is designed to contain:

at least one program ($P_i$) of the library of programs ($P_1 \ldots P_i \ldots P_n$) for the purpose of executing it by the machine (1);

a master main subprogram (SPP) issued by the supplier, and main validation keys ($V_1 \ldots V_i \ldots V_n$) at the rate of one key per program. These predetermined keys are issued by the supplier and are designed to be associated with supplementary validation keys ($V'_1, \ldots V'_i, \ldots V'_n$) as will be explained hereinbelow.

The control and processing circuits (2) are conventional with specificities peculiar to the type of machine employed.

In addition to this data processing machine (1), a potential user must possess the following auxiliary equipment:

at least one portable carrier such as a card (C) issued by the supplier and designed to cooperate with the machine (1); and a card reader (LC) coupled to the machine (1) by means of the aforsesaid input/output device (3).

The card (C) which is specific to a given user comprises as least:

one memory (M1) in which are recorded: a secret code (S);

a computer subprogram (SPC); and a table (TB) containing a set of arguments ($b_1, \ldots b_i, \ldots b_m$) to identify the programs ($P_1, \ldots P_i, \ldots P_n$); and processing circuits (4) which enable the computer subprogram (SPC) to be executed.

The reader (LC) is essentially designed to ensure the transfer of the data between the machine (1) and the card (C). The circuits making up said reader are conventional and do not have any special features, i.e. the card reader is a conventional prior art device.

In accordance with the invention, the execution of each program ($P_1 \ldots P_i \ldots P_n$) is under the supervision of a validation key which is unique to the program and to the user. Thus, each program is under the supervision of a validation key which, in actual fact, consists, with respect to the machine (1), of a main predetermined-validation key (V) and, with respect to the card (C), of a supplementary validation key (V') computed before the execution of the program.

The supplementary validation key (V') is computed by the processing circuits (4) of the card (C) which execute the computer subprogram (SPC). This subprogram (SPC) takes into account the secret code (S) recorded in the memory (M1) of the card (C) and at least one identification argument ($b_i$) peculiar to each program ($P_i$) and determined by the supplier.

A card (C) is issued to the user and all the identification arguments ($b_1 \ldots b_i \ldots b_n$) of the programs ($P_1 \ldots P_i \ldots P_n$) are prerecorded in the table (TB) stored in the memory (M1) of the card (C). Each identification argument ($b_i$) is, for example, an alphanumerical data item, and each program can be identified by one or more arguments. It is important to note that the identification arguments of the programs are preferably identical for all the potential users of the programs.

The addressing of the identification argument(s) ($b_1 \ldots b_i \ldots b_m$) of a program ($P_i$) for computing the supplementary validation key (V') is effected by means of identification parameters ($a_1 \ldots a_i \ldots a_m$) contained in each program and transmitted to the card (C) prior to the execution of the program.

In order to limit the storage area occupied by the table (TB) in the memory (M1) of the card, it is advantageous to identify each program by at least two identification arguments. In this way, it is not necessary to store as many identification arguments as there are programs. By way of example, if the table (TB) contains m arguments ($b_i$) with $m \leq n$ (n being the number of programs) and if each program is identified by two arguments, it is possible to address $C^m_n$ programs.

The main validation key (V) on the side of the machine (1) is given by the supplier who, knowing the secret code (S) of the card (C) issued to the user and the identification arguments ($b_1 \ldots b_i \ldots b_m$) of each program ($P_1 \ldots P_i \ldots P_n$), can known in advance the value of the supplementary validation key (V') and can thus determine the value of the associated main validation key (V), said two keys (V) and (V') being combined by the subprogram (SPP) in order to render the associated program executable.

The manner in which the program is rendered non-executable is not unique and the chosen solution does not modify the principle of the invention from the moment when the execution of the program is supervised by a validation key with two levels (V, V'), such as defined above. Each program ($P_1 \ldots P_i \ldots P_n$) can be rendered non-executable or scrambled total partially.

To explain the method of the invention, let us assume a user who desires to acquire the program ($P_i$) of the library of programs ($P_1 \ldots P_i \ldots P_n$), each of said programs being rendered non-executable in the state in which it has been delivered.

The supplier will issue to this user:

a program tape or disk containing the set of programs ($P_1 \ldots P_i \ldots P_n$);

a card (C) such as defined above and containing in particular a secret code (S) unique to this user;

the aforesaid subprogram (SPP) which will be recorded in the memory (M) of the user's machine (1), and the main validation key ($V_i$) peculiar to the program ($P_i$) and which will likewise be recorded in the memory (M) of the machine (1) or contained in the program ($P_i$).

When the user desires to execute the program (P$_i$), he loads, first of all, this program (P$_i$) in the memory (M) of his machine (1) by means of the program disk given by the supplier. Thereupon, the operating system of the machine (1) subjects this program (P$_i$) to the conventional transformations which are inherent in putting this program (P$_1$) in a state of execution. In accordance with the invention, even after undergoing these transformations, the program (P$_i$) is always non-executable.

To render it executable, the user will introduce the card (C) associated with his machine (1) into the reader (LC) which is coupled to the machine (1).

Let it be assumed that the program (P$_i$) is only scrambled in part. Referring to the drawing, let us assume that the program (P$_i$) contains a scrambled instruction, to wit, the instruction code for the instruction (I$_i$). In these conditions, the previous instructions (I$_1$) to (I$_k$) will be executed normally and the instruction (I$_i$−1) which precedes the instruction (I$_i$) will reroute to the subprogram (SPP), supplying at least one identification parameter (a$_i$) of the program (P$_i$).

The master or main subprogram (SPP) is executed and at the level of its instruction (J$_k$) ensures an alternate routing to the card (C) by means of the input/output device (3) under the supervision of the control circuits (2) of the machine (1). The subprogram (SPP) sends to the card (C) the identification parameter (a$_i$) in order to address at least one identification argument (b$_i$) of the table (TB) recorded in the memory (M1) of the card (C). At the level of the card (C) the computer subprogram (SPC) which takes into account the argument (b$_i$) of the program (P$_i$) and the secret code (S) of the card for the computation of the supplementary validation key (V'$_i$) by means of the processing circuits (4) of the card (C) is then executed.

Once the supplementary validation key (V'$_i$) of the program (P$_i$) has been calculated, the value of the said key (V'$_i$) is sent back by means of the reader (LC) and the input/output (3) circuit of the machine (1) to the main subprogram (SPP). The instruction (J$_i$) of the subprogram (SPP) will take this supplementary validation key (V'$_i$) into account as well as the main validation key (V$_i$) which has been prerecorded in the memory (M) of the machine (1) and is associated with the program (P$_i$). By means of these two validation keys (V$_i$, V'$_i$), the main subprogram (SPP) will unscramble the instruction (I$_i$) for the program (P$_i$). By way of example, the two keys (V$_i$) and (V'$_i$) can be binary configurations with p bits with the subprogram (SPP) which executes a logic operation such as "EXCLUSIVE OR" upon these two binary configurations, the result of this logic operation giving the instruction code of the instruction (I$_i$) for the program (P$_i$). In this way, the instruction (I$_i$) for the program (P$_i$) is unscrambled and the program (P$_i$) can then be executed in its entirety.

According to another feature of the invention, the same user can possess a single card (C) for several machines (1). In this case, the same program cannot be applied simultaneously to several machines, because the user's card must remain coupled to one machine in order to ensure the execution of the program on said machine.

Needless to say that a user can purchase the same program several times, say, twice. He will then have to have two different cards in order to apply the same program simultaneously to two machines.

Finally, if one card is issued for the possible execution of m programs among n available programs and if the user desires to obtain the execution of other programs that have not been purchased initially, it is not necessary for the supplier to issue another card to him. It suffices that the supplier simply supply the main validation key of the new program(s) without having to modify the card that has already been issued.

To enable the supplier of the programs to remain in control of their diffusion, it is important that the data recorded on the level of each card cannot be accessed from the outside in order to avoid any fraud.

While the invention has been described in connection with a particular embodiment, this description is not intended to be by way of limitation and resort should be made to the appended claims which define the full scope of the invention.

I claim:

1. A system for protecting software programs (P$_l$, . . . , P$_i$, . . . P$_n$) adapted to be executed on a data processing machine (1) of a user of the software programs, said machine having at least one memory (M), control and processing circuits (2), and an input/output device (3), the system comprising:

a card (C), specific to the user, possessing at least one memory (M1) and processing circuits (4), and a card reader (LC) coupled with the input/output device (3) of the machine (1) and with the card (C) to enable data transfer therebetween; the memory (M) of the machine (1) containing at least one program (P$_i$) delivered by a supplier of the software programs, the one program including an identification parameter (a$_i$) which identifies the one program and having a scrambled portion which renders the one program non-executable on the machine, containing a main validation key code (V$_i$), specific to the one program, issued by the supplier, and containing a master program (SPP); the memory (M1) of the card (C) containing at least one secret code (S) specific to the user and known only to the suppler, and identification arguments which identify the programs, at least one of said identification arguments (b$_i$) identifying said one program, the card having means responsive to the identification parameter (a$_i$) contained in the one program (P$_i$) for addressing said identification argument (b$_i$), and the processing circuits (4) of the card having means for computing a supplementary validation key code (V'$_i$) from the secret code (S) and the addressed identification argument (b$_i$) of the program (P$_i$) and for transferring the supplementary validation key code to the machine; and wherein the master program (SPP) is formed to combine the supplementary validation key code (V'$_i$) and the main validation key code (V$_i$) for unscrambling the scrambled portion of the program (P$_i$) and rendering the program executable.

2. A method of protecting software programs (P$_1$, . . . P$_i$, . . . P$_n$) delivered by a supplier to prospective users, each user possessing a data processing machine (1) on which said programs can be executed, the method comprising:

prior to delivery to a user rendering the programs nonexecutable in the state in which the programs are delivered, said rendering comprising scrambling a portion of each program (P$_i$) such that a predetermined validation key (V$_i$, V'$_i$) is required for unscrambling the program (P$_i$) to transform it into an executable state, said predetermined validation key comprising a combination of a main validation key ($V_i$) and a supplementary validation key ($V'_i$), the main validation key being defined in accordance with the program ($P_i$) and a secret code (S) which is unique to the user and known solely to the supplier, and the program ($P_i$) having an identification parameter ($a_i$) which identifies the program;

coupling to the user's machine a portable card having processing circuits (4) and a storage area ($M_1$) in which are recorded the user's unique secret code and identification arguments ($b_1, \ldots b_i, \ldots b_n$) which are associated with the identification parameters ($a_1, \ldots a_i, \ldots a_n$) of the programs ($P_1, \ldots P_i, \ldots P_n$);

storing in a memory (M) of the user's machine the program ($P_i$) and the corresponding main validation code ($V_i$);

transferring to the card the identification parameter ($a_i$);

producing in the processing circuits of the card the supplementary validation key ($V'_i$) for the program ($P_i$) as a function of the secret code and an associated identification argument ($b_i$) and supplying said supplementary validation key to the user's machine;

combining in the user's machine, the main validation key and the supplementary validation key to produce the predetermined validation key; and applying the predetermined validation key to the program ($P_i$) to unscramble the program ($P_i$) and transform it into an executable state.

3. The method as defined in claim 2 further comprising:

prerecording in each user's card prior to delivery of the card to the user identical identification arguments ($b_i$) for identifying the same program regardless of the user of said program, and wherein said storing comprises storing in each user's machine a main validation key ($V_i$) which differs for each program ($P_i$) delivered to the user and which differs from the main validation key for the same program ($P_i$) delivered to another user.

4. The method as defined in claim 3, wherein said prerecording further includes:

prerecording in the storage area of the card the identification arguments ($b_1, \ldots b_i, \ldots b_n$) of the programs in the form of a table (TB); and wherein the card is formed to permit addressing of at least one said identification argument ($b_i$) of the program ($P_i$) by means of at least one associated identification parameter ($a_i$) which is transferred to the card by the user's machine.

5. The method as defined in claim 2 comprising:

recording in the memory of the user's machine a main subprogram (SPP);

said subprogram (SPP) being formed to transfer the identification parameters ($a_i$) to the card (C), for addressing said identification arguments ($b_i$), to receive from the processing circuits (4) of the card (C) the supplementary validation key ($V'_i$) produced from the arguments ($b_i$) addressed by the identification parameters ($a_i$) and from the secret code (S) of the card (C), and to combine said supplementary validation key ($V'_i$) with the main validation key ($V_i$) of the program ($P_i$) to be executed in order to produce said predetermined validation key and render said program executable.

6. The method as defined in claim 2, wherein said scrambling comprises rendering at least one instruction of each program non-executable through scrambling of an instruction code of the instruction.

7. The method as defined in claim 6 further comprising forming each main validation key ($V_i$) and each supplementary validation key ($V'_i$) as a binary configuration with p bits.

8. The method as defined in claim 7, wherein, for the purpose of unscrambling the instruction code, the method further comprises forming the main validation key ($V_i$) and the supplementary validation key ($V'_i$) so as to unscramble of the instruction code upon the keys being combined in a logic operation.

* * * * *